(12) United States Patent
Mannby

(10) Patent No.: US 10,725,924 B2
(45) Date of Patent: Jul. 28, 2020

(54) LOW-LATENCY HYBRID CLIENT-SERVER COOPERATION

(71) Applicant: Microsoft Technology Licensing, LLC, Redmond, WA (US)

(72) Inventor: Claes-Fredrik Urban Mannby, Mercer Island, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 75 days.

(21) Appl. No.: 15/937,444

(22) Filed: Mar. 27, 2018

(65) Prior Publication Data
US 2019/0303298 A1   Oct. 3, 2019

(51) Int. Cl.
| | | |
|---|---|---|
| G06F 15/16 | (2006.01) | |
| G06F 12/0891 | (2016.01) | |
| G06F 12/0862 | (2016.01) | |
| G06F 3/048 | (2013.01) | |
| H04L 29/08 | (2006.01) | |
| G06F 3/0488 | (2013.01) | |
| G06F 3/023 | (2006.01) | |
| G06F 40/274 | (2020.01) | |

(52) U.S. Cl.
CPC ........ *G06F 12/0891* (2013.01); *G06F 3/0237* (2013.01); *G06F 3/048* (2013.01); *G06F 3/0488* (2013.01); *G06F 12/0862* (2013.01); *G06F 40/274* (2020.01); *H04L 67/289* (2013.01); *H04L 67/2842* (2013.01); *G06F 2212/1024* (2013.01); *G06F 2212/6024* (2013.01); *H04M 2250/70* (2013.01)

(58) Field of Classification Search
USPC .......................................................... 709/203
See application file for complete search history.

(56) References Cited

U.S. PATENT DOCUMENTS

| | | | | |
|---|---|---|---|---|
| 8,645,825 B1* | 2/2014 | Cornea | ................. | G06F 17/276 715/257 |
| 2002/0167942 A1* | 11/2002 | Fulton | ................. | G06F 11/3419 370/352 |
| 2009/0006543 A1* | 1/2009 | Smit | ................... | H04L 67/2842 709/203 |
| 2013/0253908 A1* | 9/2013 | Zhai | ...................... | G06F 40/274 704/9 |

(Continued)

FOREIGN PATENT DOCUMENTS

EP          1330889 A2       7/2003

OTHER PUBLICATIONS

"International Search Report and Written Opinion Issued in PCT Application No. PCT/US19/023050", dated Jun. 14, 2019, 13 Pages.

*Primary Examiner* — Hee Soo Kim
(74) *Attorney, Agent, or Firm* — Workman Nydegger

(57) ABSTRACT

The present disclosure includes methods, apparatus, and computer-readable media for receiving one or more user inputs from a user via a user interface, transmitting the one or more user inputs to a remote server, obtaining an expected user input interval and an expected response latency, and displaying, via the user interface, either one or more predicted inputs associated with a content of a local cache or one or more predicted inputs received from the remote server, based at least on whether the expected user input interval is greater than a product of the expected response latency and a factor.

20 Claims, 7 Drawing Sheets

(56) References Cited

U.S. PATENT DOCUMENTS

2014/0032206 A1\* 1/2014 Grieves ................ G06F 17/276
                                                                                            704/9
2018/0053101 A1    2/2018 Cudworth et al.

\* cited by examiner

LOW-LATENCY HYBRID CLIENT-SERVER COOPERATION

BACKGROUND

Mobile devices are becoming popular and allow users to access countless information and entertainment easily. Given the portability, and therefore small sizes, of mobile devices, users may find it difficult to quickly and accurately type words and phrases using the interfaces in mobile devices. To assist users with typing, many mobile devices implement predictive text entry techniques, such as autocorrect. However, to accurately predict the words users intend to type, a large amount of data and computation are necessary. Since mobile devices emphasize portability and low power consumption, it may be prohibitive for mobile devices to rely on a large amount of data and computation necessary for accurate prediction. While it may be possible for mobile devices to receive predictive data from remote servers, typical network connection speed may be insufficient to sustain the bandwidth required during normal typing. The insufficient bandwidth may lead to delay in displaying predictive text to the users, which degrades user experience. Therefore, improvement in predictive text entry techniques may be desirable to assist users to enter text quickly and accurately.

SUMMARY

The following presents a simplified summary of one or more features described herein in order to provide a basic understanding of such features. This summary is not an extensive overview of all contemplated features, and is intended to neither identify key or critical elements of all features nor delineate the scope of any or all implementations. Its sole purpose is to present some concepts of one or more features in a simplified form as a prelude to the more detailed description that is presented later.

Aspects of the present disclosure include methods, apparatus, and computer-readable media for receiving one or more user inputs from a user via a user interface, transmitting the one or more user inputs to a remote server, obtaining an expected user input interval and an expected response latency, and displaying, via the user interface, either one or more predicted inputs associated with a content of a local cache or one or more predicted inputs received from the remote server, based at least on whether the expected user input interval is greater than a product of the expected response latency and a factor.

The foregoing has outlined rather broadly the features and technical advantages of examples in order that the detailed description that follows may be better understood. Additional features and advantages will be described hereinafter. The conception and specific examples disclosed may be readily utilized as a basis for modifying or designing other structures for carrying out the same purposes of the present application. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

In some implementations, a mobile device, such as a cellular phone, a personal digital assistant, or a tablet computer, may implement a predictive text entry technique on an incomplete written content by a user. The predictive text may be generated locally based on the text input by the user and data stored in a local cache on the mobile device. The predictive text may also be generated remotely at a server. The mobile device may perform the predictive text entry technique by sending the text input by the user to the remote server and receiving the predictive text. The incomplete written content may be part of a word, phrase, hashtag, brand name, celebrity name, venue, product or service entered by the user into the mobile device. The incomplete written content may include one or more user inputs, such as characters, symbols, or numbers. The predictive text may include one or more predicted inputs generated locally or remotely based on the text input by the user. In certain examples, the predictive text may be configured as a query including the one or more predicted inputs. The query may include a request for response, the text input by the user, and/or other control or payload information.

During operation, the mobile device may receive a text input from a user for an incomplete written content, such as a word, phrase, hashtag, brand name, celebrity name, venue, product, or service. The mobile device may send the text input of the incomplete written content to the remote server. The mobile device may estimate an expected user input interval (i.e. projected time between successive character entry) and an expected response latency (i.e. projected time between sending the incomplete written content to the remote server and receiving the predictive text). If the expected user input interval is larger than the expected response latency, the mobile device may wait for the predictive text sent by the remote server, and present the predictive text sent by the remote server to the user. If, on the other hand, the expected user input interval is smaller than or equal to the expected response latency, the mobile device may present the predictive text generated locally based on the incomplete written content and the data stored in the local cache of the mobile device.

Figure 1:
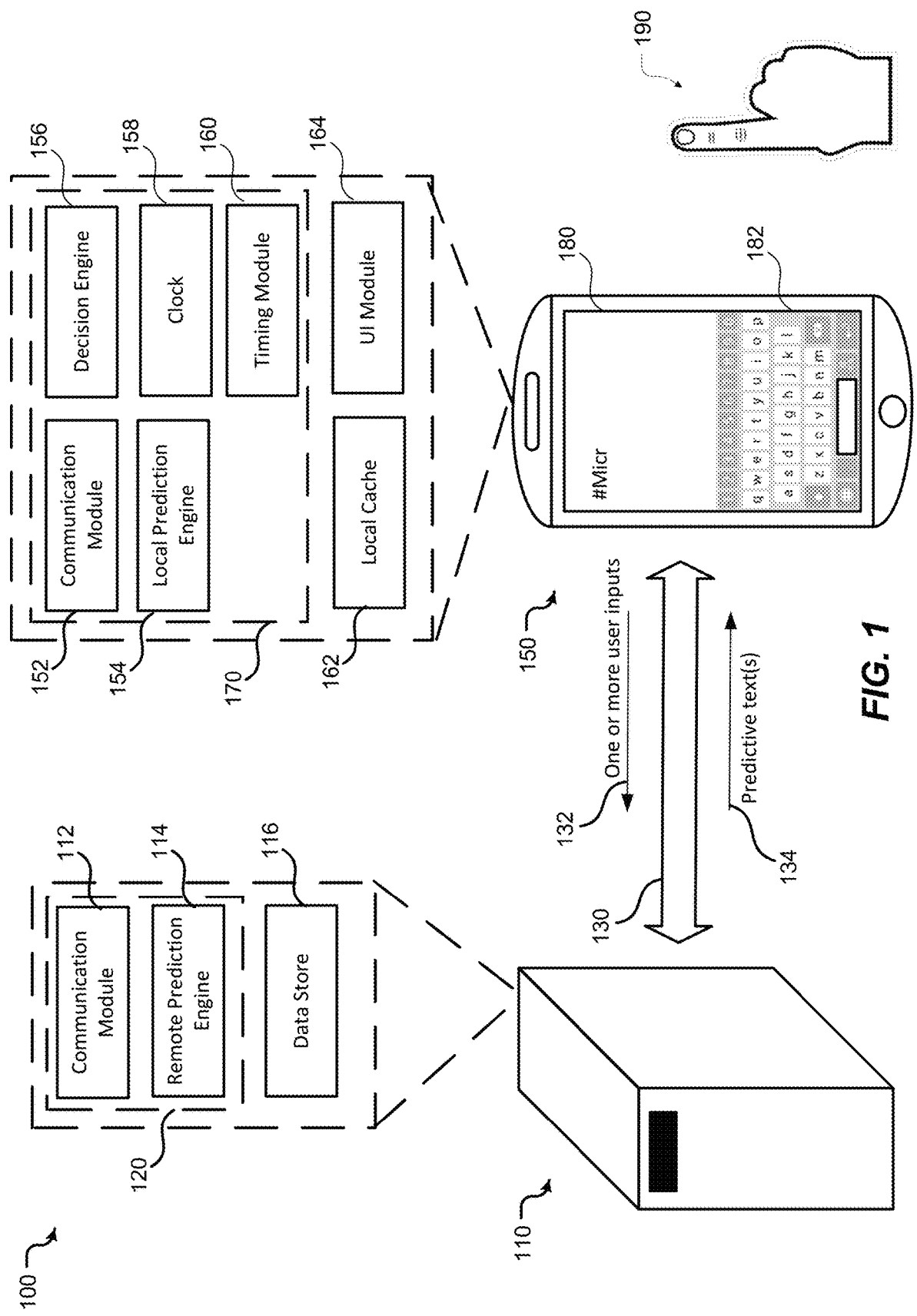
FIG. 1 is a schematic diagram of an example of a system for predictive text entry.

Referring to FIG. 1, an example of a system 100 for predictive text entry may include a remote server 110 and a mobile device 150. The mobile device 150 includes a decision engine 156 that controls generating predictive text based on a local cache, or based on communication with the remote server 110, depending on a speed of user input and an expected response time associated with the remote server 110. The mobile device 150 and the remote server 110 may communicate via a communication network 130. The communication network 130 may include a wired or a wireless network such as local area network (LAN), a wide area network (WAN), a cloud network, a wireless fidelity (Wi-Fi)

network, or a mobile network. The mobile device 150 and the remote server 110 may exchange data via the communication network 130.

In certain implementations, the mobile device 150 may include a communication module 152 configured to communicate with the remote server 110. For example, the communication module 152 may transmit one or more user inputs 132 to the remote server 110 and receive predictive text(s) 134 from the remote server 110. The mobile device 150 may further include a local prediction engine 154 and a local cache 162. When the mobile device 150 receives the one or more user inputs, the local prediction engine 154 may analyze the one or more user inputs and content of the local cache 162 to generate the predictive text. The cache local 162 may store incomplete textual strings (e.g. the one or more user inputs), potential predictive texts associated with the incomplete textual strings, and/or contextual relationships between the incomplete textual strings and the associated predictive texts. In some examples, the local cache 162 may store less information than the data store 116. The incomplete textual strings may be one or more user inputs. The potential predictive texts may include the one or more predicted inputs. In some examples, the one or more predicted inputs may include a most-likely candidate for the one or more user inputs, and other potential candidates.

In some implementations, the mobile device 150 may include a decision engine 156 configured to determine whether an expected user input interval is larger than an expected response latency and whether to perform predictive text entry remotely or locally. For example, if the expected user input interval is larger than the expected response latency, the decision engine 156 of the mobile device 150 may decide to transmit the one or more user inputs to the remote server 110 so the remote server 110 may perform predictive text entry remotely. If the expected user input interval is smaller than or equal to the expected response latency, the decision engine 156 may decide to perform predictive text entry locally.

In certain implementations, the mobile device 150 includes a clock 158 and a timing module 160. The timing module 160 may utilize the clock 158 to measure the expected user input interval and/or the expected response latency. The timing module 160 may be a hardware (e.g. processor), a software (computer executable code), or a combination of hardware/software module in the mobile device 150 that measures and provides timing data. For example, the timing module 160 may keep track of the time, as indicated by the clock 158, of when the user provides inputs. The differences between successive inputs may be used to compute the expected user input interval as described below. Further, the timing module 160 may also keep track of the time, as indicated by the clock 158, of a round-trip time of a message sent to and received from the remote server 110. The communication module 152, the local prediction engine 154, the decision engine 156, the clock 158, and the timing module 160 may be part of a local service 170 configured to provide predictive text entry services locally to the mobile device 150.

In some implementations, the mobile device 150 includes a user interface (UI) module 164 configured to receive the one or more user inputs typed by a user 190, and display the obtained predictive text to the user 190. In certain examples, the UI module 164 may include a touch-sensitive display 180 and a touch-sensitive keyboard 182.

In one non-limiting example, the user 190 may input "#Micr" via the UI module 164. The timing module 160 may determine that the expected user input interval is 200 milliseconds and the expected response latency is 160 milliseconds (including the transmission time from the mobile device 150 to the remote server 110 and back, and the computation time at the remote server). The decision engine 156 may decide that the expected user input interval is larger than the expected response latency. In response to this determination, the communication module 152 sends the input string "#Micr" to a communication module 112 of the remote server for a cloud service 120 to perform the predictive text entry. After the communication module 112 receives the #Micr" string, a remote prediction engine 114 may search in the data store 116 for possible predictive texts. If the mobile device 150 has previously typed words such as "Word", "Excel", and "PowerPoint", the remote prediction engine 114 may decide that "#Microsoft™" is the most likely predictive text. If the mobile device 150 has just arrived in Boise, Idaho (based on its global positioning system data), the remote prediction engine 114 may decide that "#Micron™" is the most likely predictive text. If the user 190 has just purchased books authored by Gregory Mankiw or books relating to marginal utility and demand, the remote prediction engine 114 may decide that "#Microeconomics" is the most likely predictive text. After the remote prediction engine 114 determines the most likely predictive text, the communication module 112 may transmit the most likely predictive text back to the mobile device 150 to be displayed to the user 190 via the UI module 164. The mobile device 150 may be a computer device, e.g., including a processor and a memory, such as an example system described in greater detail in FIG. 6.

In some implementations, the remote server 110 may include the communication module 112 configured to communicate with the mobile device 150. The communication module 112 may be configured using one or more of a transceiver, a transmitter, a receiver, a modem, or software that sends and receives digital data via the communication network 130. For example, the communication module 112 may receive one or more user inputs (e.g. characters, numbers, symbols) transmitted by the mobile device 150, and transmit a predictive text to the mobile device 150. The one or more user inputs may be characters, numbers, and symbols typed or otherwise entered by the user into the mobile device 150. The remote server 110 may also include the remote prediction engine 114 and a data store 116. The remote prediction engine 114 may include, but is not limited to, hardware (e.g. processors) and/or software (computer executable code) configured to estimate the likely predictive text based on the one or more user inputs. When the remote server 110 receives the one or more user inputs, the remote prediction engine 114 may analyze the one or more user inputs and content of the data store 116 to generate the predictive text. The data store 116 may store incomplete textual strings, potential predictive texts associated with the incomplete textual strings, and/or contextual relationships between the incomplete textual strings and the associated predictive texts. The incomplete textual strings may be one or more user inputs. The potential predictive texts may include the one or more predicted inputs. In some examples, the one or more predicted inputs may include a most-likely candidate for the one or more user inputs, and other potential candidates. For example, the data store may include an incomplete textual string of "bru", and the associated predictive texts may include "Brussel" (contextual relationship "geographic location"), "Bruce Springsteen" (contextual relationship "singer" or "music"), "Brussels sprout" (contextual relationship "food"), "brush" (contextual relationship "tool"), and "brusque" (contextual relationship "behavior"). In another example, the data store 116 may store potential predictive texts with associated contextual information. In addition, in some implementations, the data store 116 may also store a match likelihood metric, or a confidence metric, associated with each respective incomplete textual string that identifies a value associated with a likelihood or confidence that the incomplete textual string may be intended to be an input that matches the respective one of the predictive texts. The remote prediction engine 114 may search for a desired predictive text by entering an incomplete textual string, such as "pr", and receive one or more of the following predictive texts: "Prince" (contextual relationship "musician"), "Pringles™" (contextual relationship "food"), "Price is Right™" (contextual relationship "game show"), or "program" (contextual relationship "software"). In some implementations, the remote prediction engine 114 may order the one or more predictive texts based on the match likelihood metric, or the confidence metric, or may include these metrics with the predictive texts. The communication module 112 and the remote prediction engine 114 may be part of the cloud service 120 configured to provide predictive text entry services to clients such as the mobile device 150. The remote device 110 may be a computer device, e.g., including a processor and a memory, such as an example system described in greater detail in FIG. 7.

Figure 2:
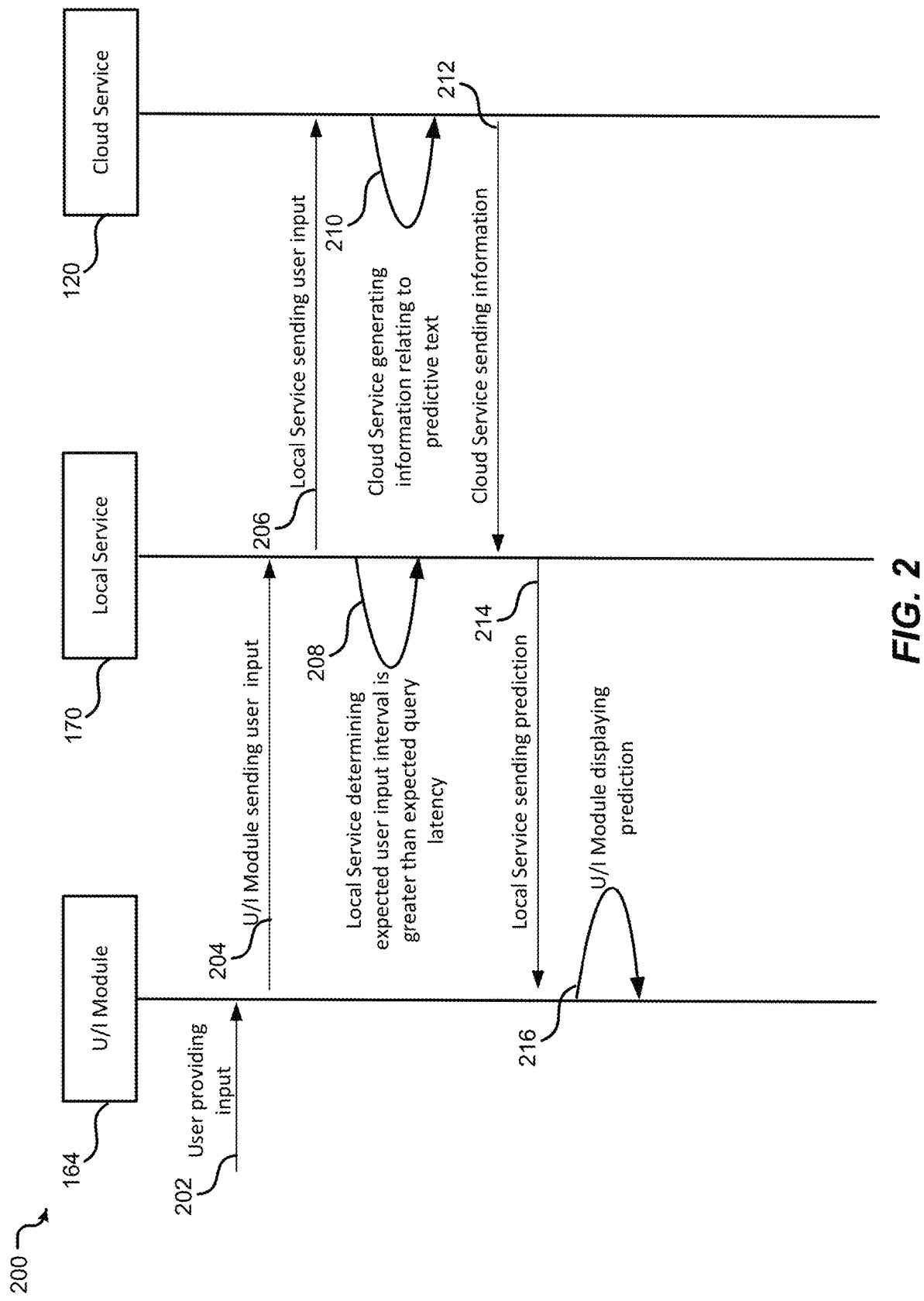
FIG. 2 is a process flow diagram of an example of a method for predictive text entry.

Turning now to FIG. 2, a process flow diagram 200 illustrates an example of a method for predictive text entry. First, in certain implementations, the user may provide (202) one or more user inputs to the UI module 164. The one or more user inputs may include characters, alphabets, numbers, symbols, phonetics, keys, or other textual representations. For example, the one or more user inputs may be part of a hashtag (e.g. "#La" for "#Lakers"), part of a brand name (e.g. "Este" for "Estee Lauder™"), or part of an item (e.g. "tele" for "telephone"). In a non-limiting example, the one or more user inputs may be "#Yose" or "#Yoes" (user inputs with a typographical error) for "#Yosemite".

Next, the UI module 164 may send (204) the one or more user inputs to the local service 170 of the mobile device 150. The local service 170 of the mobile device may then send (206) the one or more user inputs to the cloud service 120.

After sending (206) the one or more user inputs to the cloud service 120, the local service 170 may determine (208) that the expected user input interval is greater than the expected response latency. In other examples, the local service 170 may determine (208) that the expected user input interval is greater than a product of a factor and the expected response latency. The factor may be used to provide a "buffer" time that the mobile device 150 may use to display the predictive text after receiving the predictive text from the remote server 110. For example, if the mobile device 150 expects a long "buffer" time, the factor may be set as 1.5. If the mobile device 150 expects a short "buffer" time, the factor may be set as 1.05. The factor may range from 1 to 5, 1 to 4, or 1 to 2. The factor may be 1, 1.1, 1.2, 1.5, 2, 2.5.

In an example, the timing module 160 of the local service 170 may determine the expected user input interval by calculating an average of intervals of previous user inputs as measured by the clock 158. For example, if the user 190 previously typed the words "janitor", and the intervals between "j" and "a", "a" and "n", "n" and "i", "i" and "t", "t" and "o", and "o" and "r" are 194, 156, 174, 212, 181, and 205 milliseconds, respectively, the average interval is 187 milliseconds. The timing module 160 may use the average interval of 187 milliseconds as the expected user input interval. Alternatively, the timing module 160 may use a simple moving average, a weighted moving average, a cumulative moving average, or an exponential moving average to calculate the expected user input interval.

If the local service 170 determines (208) that the expected user input interval is greater than the expected response latency, the local service 170 may wait for the remote service 120 to send the predictive text. Next, the cloud service 120 may analyze the one or more user inputs and content of the data store 116 to generate (210) information relating to the predictive text. For example, the remote prediction engine 114 of the cloud service 120 may receive the one or more user inputs of "#Yose" and determine the most likely predictive text is "#Yosemite". The information may include the entire hashtag "#Yosemite" or the characters "mite". The remote prediction engine 114 may rely on a location of the mobile device 150, context of the one or more user inputs, a frequency of usage of the hashtag "#Yosemite", popular items at the time of the prediction, popular brands at the time of the prediction, common hashtags, company names relevant to the user 190, venues near the mobile device 150, and/or languages used by the user 190 to determine the most likely predictive text. In some examples, the remote prediction engine 114 may generate information relating to multiple predictive texts.

Next, the cloud service 120 may send (212) the information relating to the predictive text. After receiving the information, the local service 120 may send (214) the predictive text of "#Yosemite" or "mite" to the UI module 164. The UI module 164 may display (216) the hashtag "#Yosemite" to the user 190.

Figure 3:
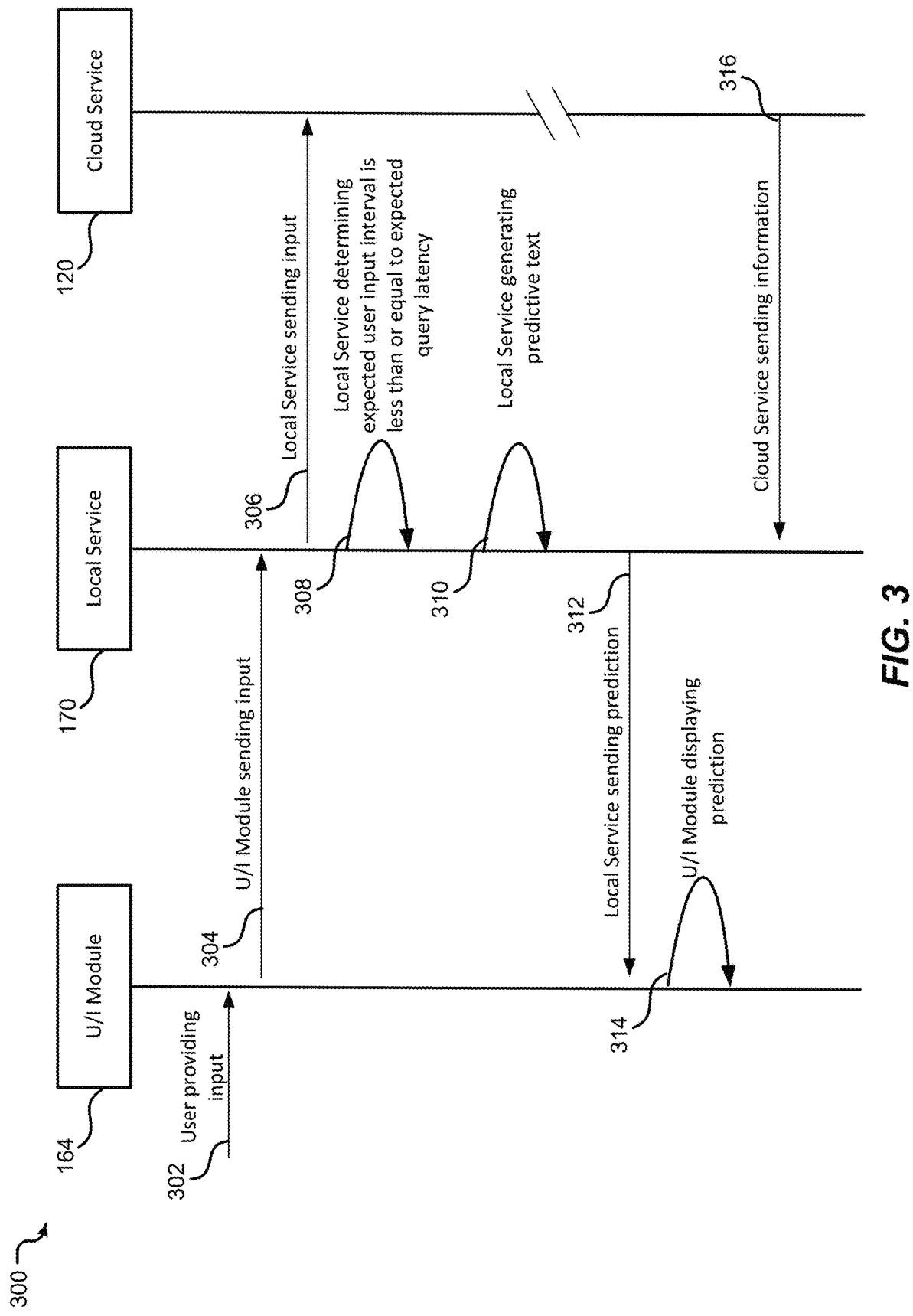
FIG. 3 is a process flow diagram of another example of a method for predictive text entry.

Turning now to FIG. 3, a process flow diagram 300 illustrates another example of a method for predictive text entry. First, in certain implementations, the user may provide (302) one or more user inputs to the UI module 164. The one or more user inputs may include characters, alphabetic characters, numbers, symbols, phonetics, keys, or other textual representations. In a non-limiting example, the one or more user inputs may be "#fo".

Next, the UI module 164 may send (304) the one or more user inputs to the local service 170 of the mobile device 150. The local service 170 of the mobile device may then send (306) the one or more user inputs to the cloud service 120. After sending (306) the one or more user inputs to the cloud service 120, the local service 170 may determine (308) that the expected user input interval is less than or equal to the expected response latency.

If the local service 170 determines (308) that the expected user input interval is less than or equal to the expected response latency, the local service 170 may analyze the one or more user inputs and the local cache 162 to generate (310) the predictive text. For example, the local prediction engine 154 of the local service 170 may receive the one or more user inputs of "#fo" and determine the most likely predictive text is "#foodie". The local prediction engine 154 may rely on a location of the mobile device 150, context of the one or more user inputs, a frequency of usage of the hashtag "#Yosemite", popular items at the time of the prediction, popular brands at the time of the prediction, common hashtags, company names relevant to the user 190, venues near the mobile device 150, and/or languages used by the user 190 to determine the most likely predictive text. In some examples, the local prediction engine 154 may generate multiple predictive texts, such as "#foodie", "#food", and "#follow".

Next, the local service 120 may send (312) the predictive text of "#foodie" to the UI module 164. The UI module 164 may display (314) the hashtag "#Yosemite" to the user 190.

Figure 4:
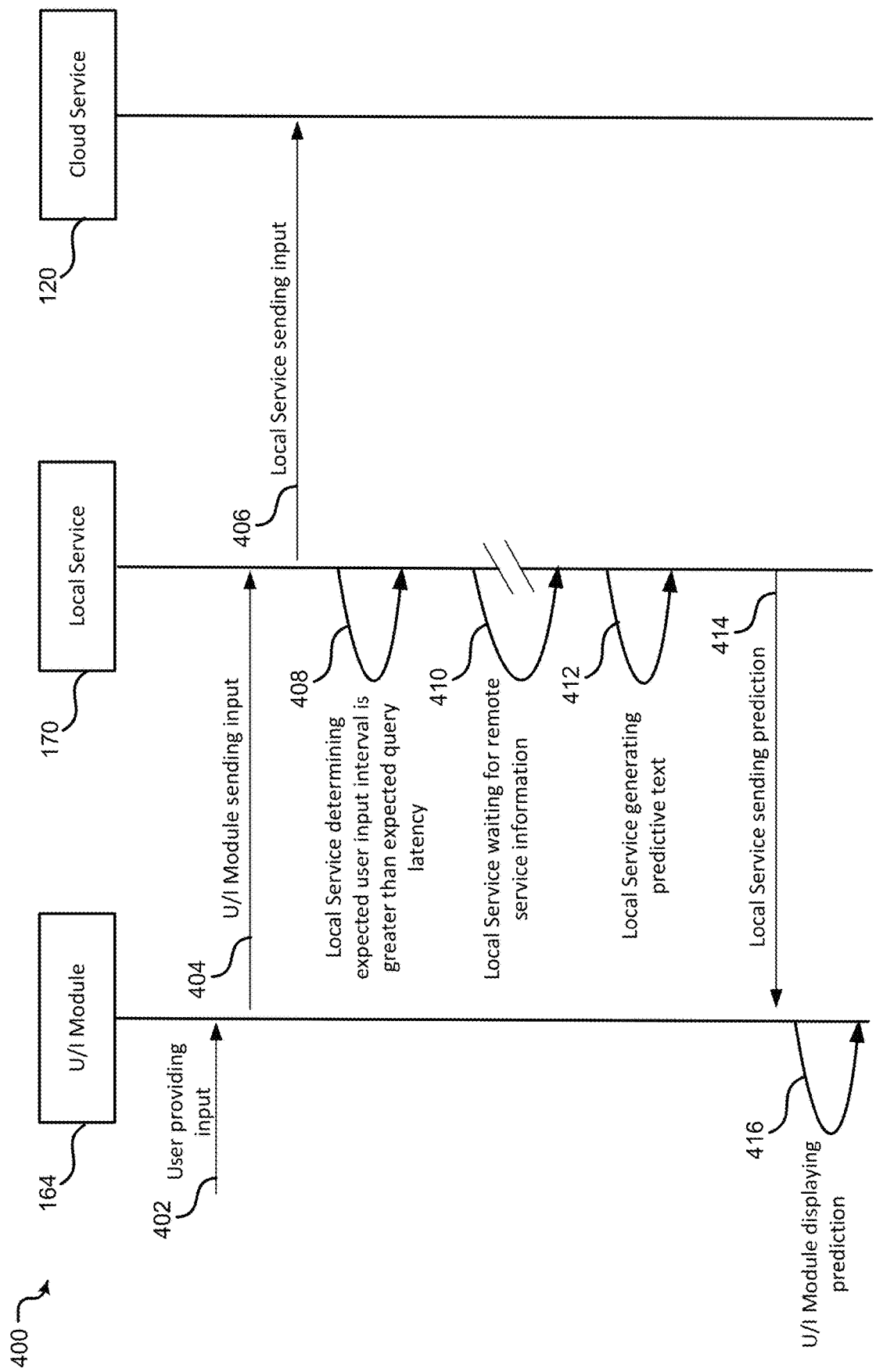
FIG. 4 is a process flow diagram of yet another example of a method for predictive text entry.

Referring to FIG. 4, a process flow diagram 400 illustrates an example of a method for predictive text entry. First, in certain implementations, the user may provide (402) one or more user inputs to the UI module 164. The one or more user inputs may include characters, alphabetic characters, numbers, symbols, phonetics, keys, or other textual representations. In a non-limiting example, the one or more user inputs may be "#Ca".

Next, the UI module 164 may send (404) the one or more user inputs to the local service 170 of the mobile device 150. The local service 170 of the mobile device may then send (406) the one or more user inputs to the cloud service 120.

After sending (406) the one or more user inputs to the cloud service 120, the local service 170 may determine (408) that the expected user input interval is less than or equal to the expected response latency. In other examples, the local service 170 may determine (408) that the expected user input interval is greater than a product of a factor and the expected response latency.

If the local service 170 determines (408) that the expected user input interval is greater than the expected response latency, the local service 170 may wait (410) for the remote service 120 to send the predictive text. The local service 170 may wait (410) for information from the remote service 120 for a predetermined period of time. During the wait, the local service 170 may not send any predictive text to the UI module 164. Further, during the wait, the UI module 164 may continue to send the one or more user inputs to solicit a response. However, if the remote service 120 fails to send the predictive text within the predetermined period of time, e.g. 500 milliseconds after the local service sending (406) the one or more user inputs, the local service 170 may analyze the one or more user inputs and the local cache 162 to generate (412) the predictive text. For example, the local prediction engine 154 of the local service 170 may receive the one or more user inputs of "#Ca" and determine the most likely predictive text is "#California".

Next, the cloud service 120 may send (414) the predictive text to the UI module 164. The UI module 164 may display (416) the hashtag "#California" to the user 190.

Figure 5:
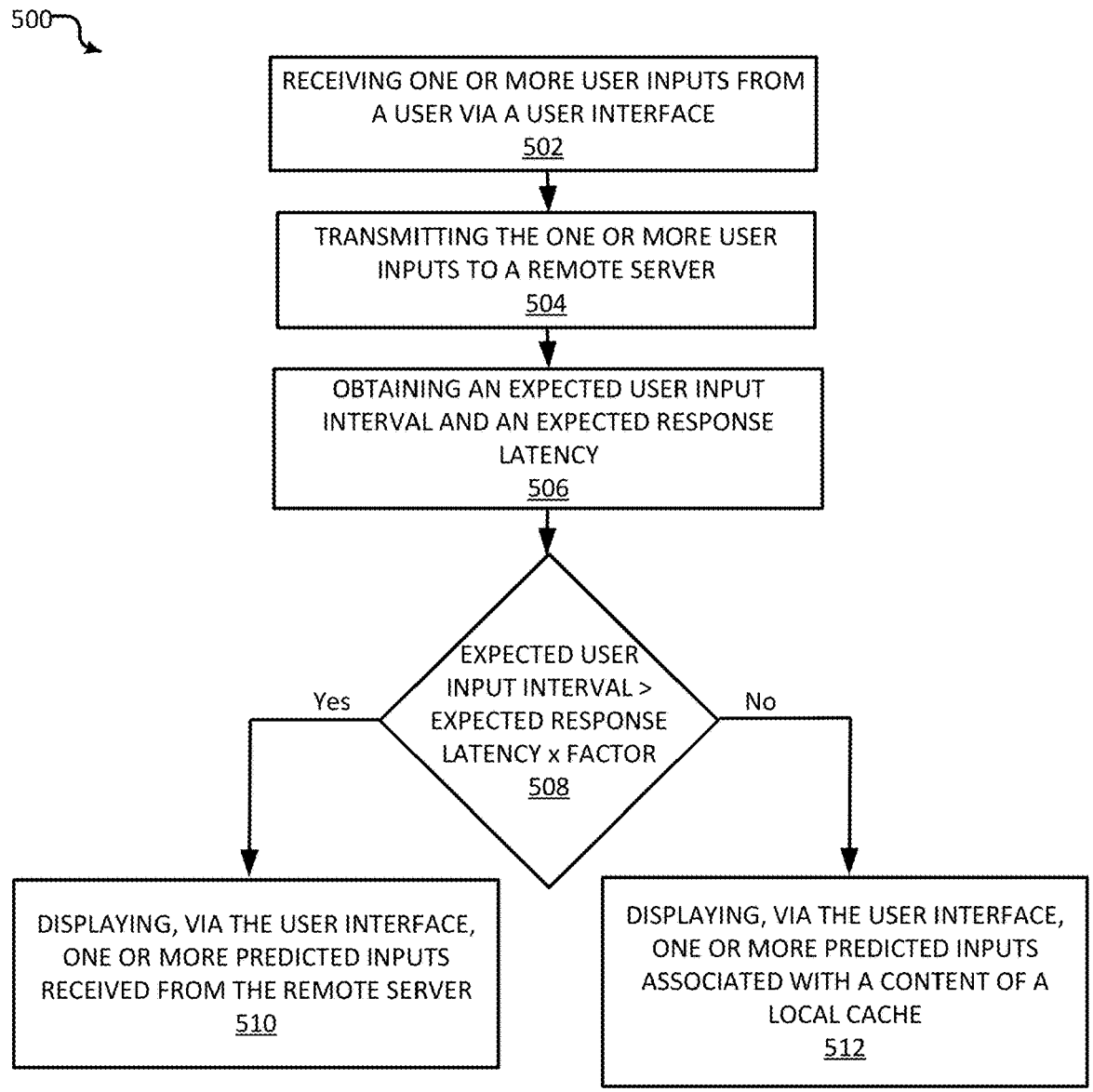
FIG. 5 is a block diagram of an example of a method for predictive text entry.

Referring now to FIG. 5, the mobile device 150 may perform a method 500 of predictive text entry. At block 502, the method 500 may receive one or more user inputs from a user via a user interface. For example, the UI module 164 may receive four characters "#MeT" from the user 190 via the touch-sensitive keyboard 182. The user 190 may sequentially provide 4 inputs (i.e. #, M, e, T) by physically contacting the respective keys on the touch-sensitive keyboard 182.

At block 504, the method 500 may transmit the one or more user inputs to a remote server. For example, the communication module 152 may transmit the four characters "#MeT" to the remote server 110 via the communication network 130.

At block 506, the method 500 may obtain an expected user input interval and an expected response latency. For example, the timing module 160 may obtain an expected user input interval and an expected response latency. The timing module 160 may utilize the clock 158 to measure the expected user input interval and the expected response latency. In certain examples, the expected user input interval may be the projected temporal pause between successive user inputs. In one implementation, if the user 190 previously typed the words "Amadeus Mozart", and the intervals between "A" and "m", "m" and "a", "a" and "d", "d" and "e", "e" and "u", and "u" and "s" are 156, 205, 170, 218, 201, and 190 milliseconds, respectively, and the intervals between "M" and "o", "o" and "z", "z" and "a", "a" and "r", and "r" and "t" are 192, 225, 186, 203, and 188 milliseconds. The interval between "s" and "M" may or may not be included in the calculation for the expected user input interval. Without including the interval between "s" and "M", the average interval for the term "Amadeus Mozart" is 194 milliseconds. The timing module 160 may use the average interval of 194 milliseconds as the expected user input interval. Alternatively, the timing module 160 may use a simple moving average, a weighted moving average, a cumulative moving average, or an exponential moving average to calculate the expected user input interval. In other examples, the timing module 160 may measure previous n response latencies to obtain the expected response latency. In one implementation, the timing module 160 may set the expected response latency as the average response latencies for the previous n response requests, e.g. 115 milliseconds. In other implementations, the timing module 160 use a simple moving average, a weighted moving average, a cumulative moving average, or an exponential moving average to calculate the expected response latency based on the response latencies of the previous n response requests.

At block 508, the method 500 may determine whether the expected user input interval is greater than a product of the expected response latency and a factor. For example, the decision engine 156 may determine that the expected user input interval (194 milliseconds) is greater than the product of the expected response latency (115 milliseconds) and a factor of 1.1. In some implementations, the factor may range from 1 to 5, including 1.1, 1.2, 1.5, 2, 2.5, 3.5, and 5. The factor may account for delay between step 512 and step 514 (described below).

At block 510, the method 500 may display, via the user interface, one or more predicted inputs received from the remote server, if the method 500 determines the expected user input interval is greater than the product of the expected response latency and the factor. For example, the touch-sensitive display 180 of the UI module 164 may display "#MeToo" to the user 190 if the decision engine 156 determines 194 milliseconds is greater than 1.1×115 milliseconds. In some examples, prior to displaying the one or more predicted inputs, the local prediction engine 154 may first identify "#MeToo" or "oo" from the remote server 110 including receiving "#MeToo" or "oo" from the remote server 110 in response to transmitting "#MeT" to the remote server 110. The hashtag "#MeToo" may be the selected by the remote prediction engine 114 as the most likely predictive text due to its popularity at the time of the prediction. In certain implementations, the communication module 152 may receive "#MeToo" or "oo" from the remote server 110. In other implementations, the one or more user inputs received by the communication module 152 may include "#MeToo" and other candidate predictive texts, such as "#metmuseum", "#metopera", and "#Met". In some examples, for example, the local prediction engine 154 may predict "#MeToo" based on the one or more predicted inputs sent by the remote server 110.

In alternative implementations, at block 512, the method 500 may display, via the user interface, one or more predicted inputs associated with a content of a local cache, if the method 500 determined the expected user input interval is not greater than a product of the expected response latency and a factor. For example, the touch-sensitive display 180 of the UI module 164 may display "#MeToo" to the user 190, if the decision engine 156 determines the expected user input interval is not greater than the product of the expected response latency and the factor. In some examples, prior to displaying the one or more predicted inputs, the local prediction engine 154 may identify "#MeToo" based on the content of the local cache 162, and "#MeT"The prediction may be based on a location of the mobile device 150, context of the one or more user inputs, an event associated with the user 190 or the mobile device 150, a frequency of usage of the hashtag "#Yosemite", popular items at the time of the prediction, popular brands at the time of the prediction, common hashtags, company names relevant to the user 190, venues near the mobile device 150, and/or languages used by the user 190.

In certain implementations, the mobile device 150 may prepopulate the local cache 162 prior to the UI module 164 receiving one or more user inputs by downloading at least a portion of the content from the remote server 110. The at least a portion of the content may be selected based on a location of the mobile device 150, a current time, or a user history of the user. In other implementations, the mobile device 150 may use the information from the remote server 110 to update the content of the local cache 162. The local cache 162 may be updated periodically, such as every 30 minutes, every hour, every 2 hours, every 6 hours, every 12 hours, or every 24 hours.

In some examples, the mobile device 150 may prune the content of the local cache 162 by deleting a portion of the potential predictive texts. When determining the portion of the potential predictive texts to delete, the mobile device 150 may use a most-specific-first policy (i.e. deleting the most specific texts first), a longest-first policy (i.e. deleting the longest texts first), a shortest-first policy (i.e. deleting the shortest texts first), an oldest-first policy (i.e. deleting the oldest texts first), a youngest-first policy (i.e. deleting the youngest texts first), a least-recently-first policy (i.e. deleting the least recently used texts first), or a least-frequently-first policy (i.e. deleting the least frequently used texts first).

Figure 6:
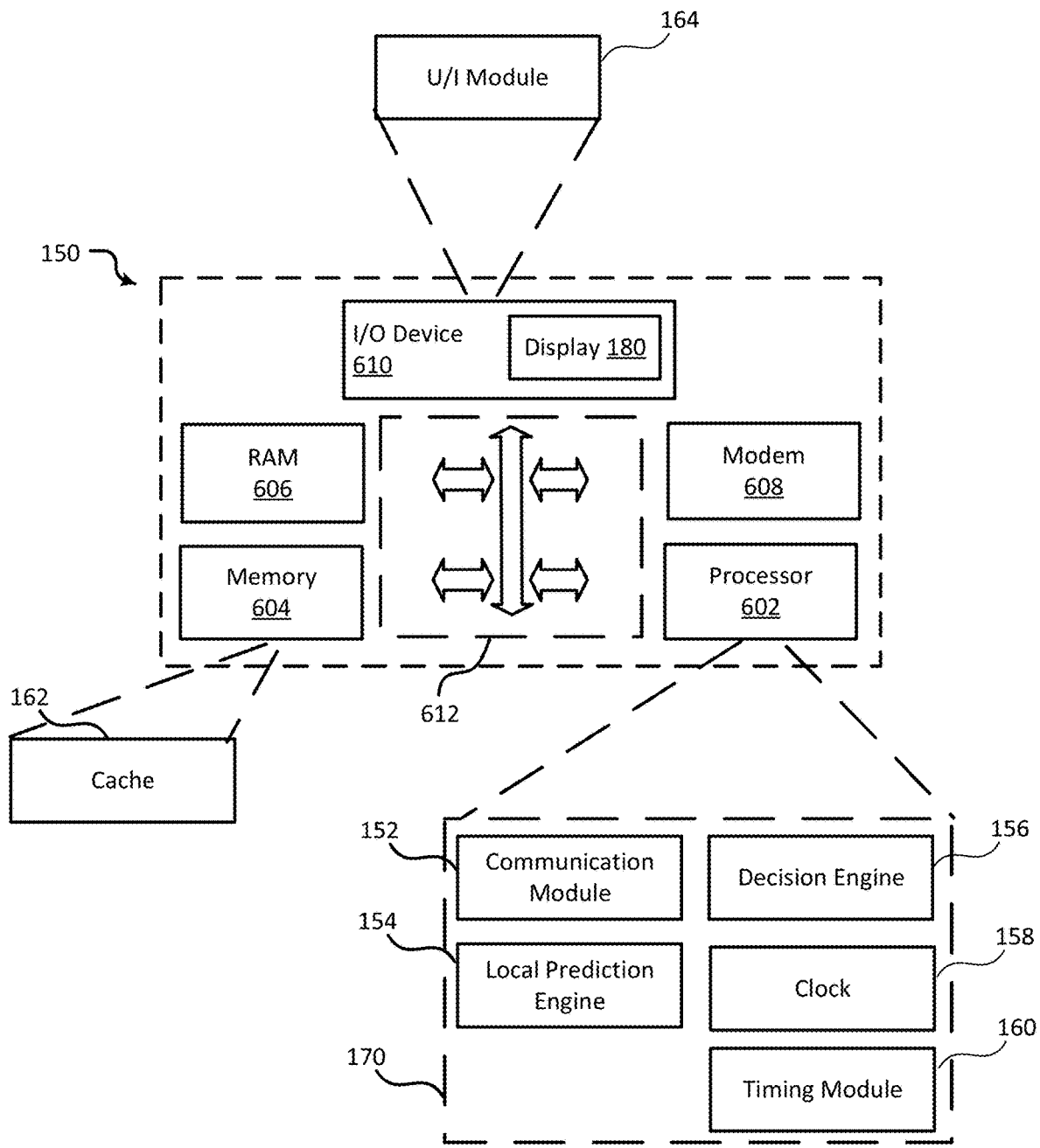
FIG. 6 is a block diagram showing an example of a mobile device implementing predictive text entry techniques.

Referring to FIG. 6, the mobile device 150 may include a processor 602 configured to implement the local service 170. Components of the local service 170 may be implemented as hardware in the processor 602 for example, as software code executed by the processor 602, or a combination thereof. The processor 602 may include one or more processors or cores, and may be implemented as a semiconductor processor, a field programmable gate array, a programmable logic device, a processing cluster, an application specific integrated circuit, or other suitable architectures. The mobile device 150 includes a memory 604 including the local cache 162. The memory may be static or dynamic memory such as flash memory, random access memory, magnetic memory, or semiconductor memory. The memory 604 may include external memory accessible via the network communication 130 such as a cloud storage. The mobile device 150 further includes a modem 608 for communicating with the remote server 110. The mobile device 150 also includes a RAM 606, such as static or dynamic random access memory (RAM). The mobile device 150 may also include an Input/Output (I/O) device 610 connected to the touch sensitive display 180. The I/O device 610 may be configured to implement the UI module 164. The components within the mobile device 150 may be interconnected by a bus 612.

Figure 7:
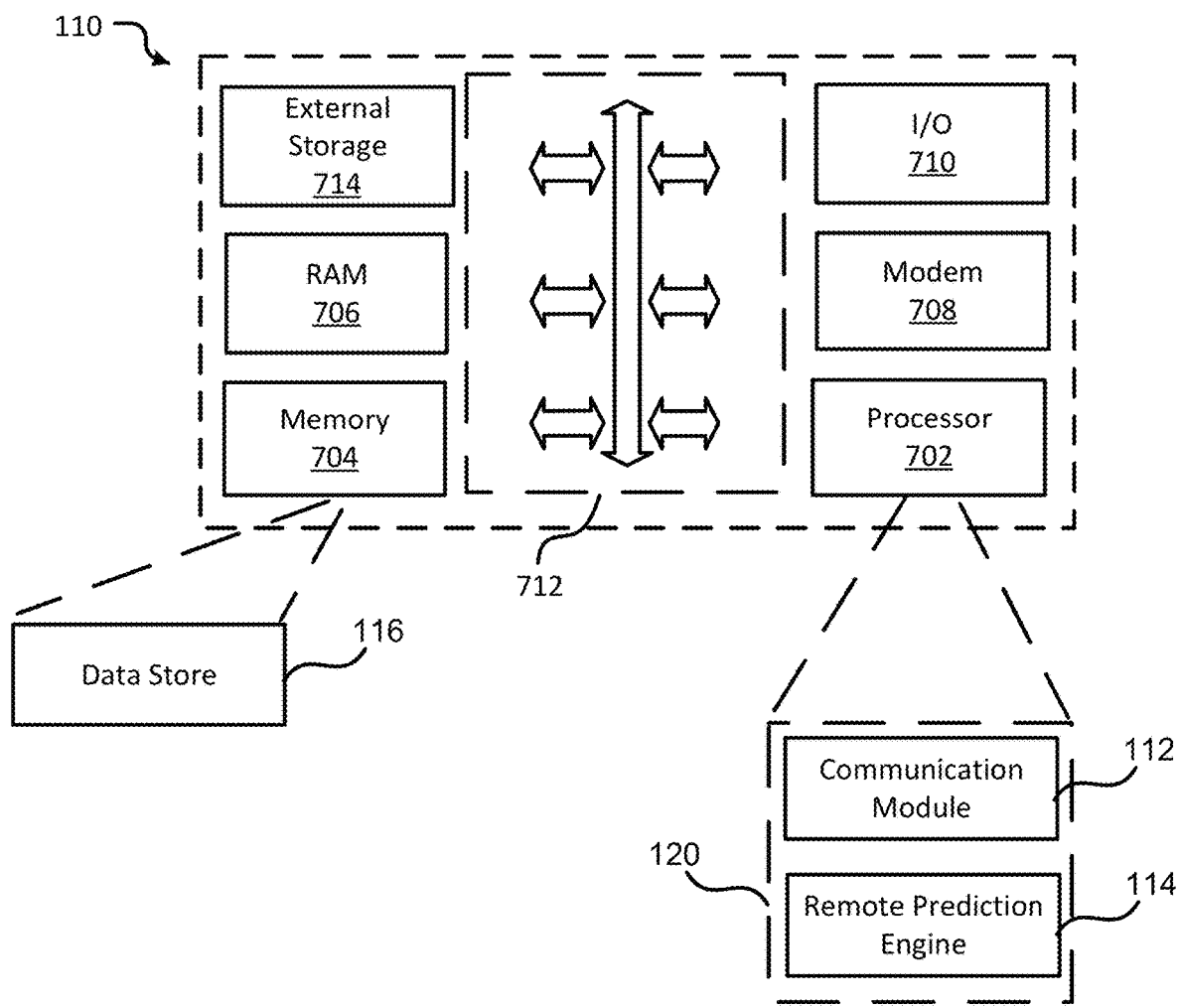
FIG. 7 is a block diagram showing an example of a server implementing predictive text entry.

Referring to FIG. 7, one example of the remote server 110 may include a variety of components, some of which have already been described above. The remote server 110 may include a processor 702 configured to implement the remote service 120. Components of the remote service 120 may be implemented as hardware in the processor 702 for example, as software code executed by the processor 702, or a combination thereof. The remote server 110 includes a memory 704 including the data store 116. A RAM 706, a modem 708, an I/O device 710, and a bus 712 of the remote server 110 may be the same as or similar to the corresponding components of the mobile device 150, as described above, but configured or otherwise programmed for server operations as opposed to mobile device operations. The remote server 110 may also include an external storage 714 such as external hard drives, backup drives, cloud storage, network drives. In some examples, a portion of all of the data store 116 may be stored in the external storage 714.

As used in this application, the terms "device," "component," "system," and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various examples are described herein in connection with a device, which can be a wired device or a wireless device. A wireless device may be a computer, a gaming device, cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Further, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any example described herein as "exemplary" is not necessarily to be construed as preferred or advantageous over other examples. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this application that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various examples or features are presented in terms of systems that may include a number of devices, components, modules, and the like. It is to be understood and appreciated that the various systems may include additional devices, components, modules, etc., and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof specially-designed to perform the functions described herein. A specially programmed general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some examples, the processor and the storage medium may reside in an ASIC. Additionally, in some examples, the steps and/or actions of a method or algorithm may reside as one or any combination or set of codes and/or instructions on a machine readable medium and/or computer readable medium, which may be incorporated into a computer program product.

In one or more examples, the functions described may be implemented in hardware, software, firmware, or any combination thereof. If implemented in software, the functions may be stored or transmitted as one or more instructions or code on a computer-readable medium, which includes a non-transitory computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While examples of the present application have been described in connection with examples thereof, it will be understood by those skilled in the art that variations and modifications of the examples described above may be made without departing from the scope hereof. Other examples will be apparent to those skilled in the art from a consideration of the specification or from a practice in accordance with examples disclosed herein.

What is claimed is:

1. A mobile device, comprising:
    a memory including a local cache;
    a user interface including an input device configured to receive one or more user inputs and a display; and
    a processor operatively coupled to the memory, the processor being configured to:
    receive, at the mobile device, the one or more user inputs from a user via the input device of the user interface;
    obtain an expected user input interval and an expected response latency;
    determine whether the expected user input interval is greater than a product of the expected response latency multiplied by a factor, and either:
    transmit the one or more user inputs to a remote server and display, via the user interface, one or more predicted inputs received from the remote server when the expected user input interval is greater than the product of the expected response latency multiplied by the factor; or alternatively
    rather than transmitting the one or more user inputs to the remote server and receiving the one or more predicted inputs from the remote server, display, via the user interface, one or more predicted inputs received from the local cache when the expected user input interval is less than the product of the expected response latency multiplied by the factor.

2. The mobile device of claim 1, wherein the displaying includes:
    displaying the one or more predicted inputs associated with the content of the local cache in response to the expected user input interval being less than or equal to the product of the expected response latency and the factor; and
    displaying the one or more predicted inputs received from the remote server in response to the expected user input interval being greater than the product of the expected response latency and the factor.

3. The mobile device of claim 1, wherein the processor is further configured to prepopulate the local cache by downloading at least the portion of the content from the remote server prior to receiving the one or more user inputs.

4. The mobile device of claim 3, wherein at least the portion of the content is based on an event, a current time, a user history of the user, or any combination thereof.

5. The mobile device of claim 1, wherein the processor is further configured to update the local cache with the one or more predicted inputs from the remote server.

6. The mobile device of claim 5, wherein updating the local cache includes pruning existing content in the local cache based on a most-specific-first policy, a longest-first policy, a shortest-first policy, an oldest-first policy, a youngest-first policy, a least-recently-first policy, or a least-frequently-first policy.

7. The mobile device of claim 1, wherein obtaining the expected user input interval includes calculating an average, a simple moving average, a weighted moving average, a cumulative moving average, or an exponential moving average on a plurality of user input intervals prior to the one or more user inputs.

8. A method, comprising:
receiving, at a mobile device, one or more user inputs from a user via a user interface;
obtaining an expected user input interval and an expected response latency;
determining whether the expected user input interval is greater than a product of the expected response latency multiplied by a factor, and either:
transmitting the one or more user inputs to a remote server and displaying, via the user interface, one or more predicted inputs received from the remote server when the expected user input interval is greater than the product of the expected response latency multiplied by the factor; or alternatively
rather than transmitting the one or more user inputs to the remote server and receiving the one or more predicted inputs from the remote server, displaying, via the user interface, one or more predicted inputs received from the local cache when the expected user input interval is less than the product of the expected response latency multiplied by the factor.

9. The method of claim 8, wherein the displaying includes:
displaying the one or more predicted inputs associated with the content of the local cache in response to the expected user input interval being less than or equal to the product of the expected response latency and the factor; and
displaying the one or more predicted inputs received from the remote server in response to the expected user input interval being greater than the product of the expected response latency and the factor.

10. The method of claim 8, further comprising prepopulating the local cache by downloading at least the portion of the content from the remote server prior to receiving the one or more user inputs.

11. The method of claim 8, further comprising updating the local cache with the one or more predicted inputs from the remote server.

12. The method of claim 11, wherein updating the local cache includes pruning existing content in the local cache based on a most-specific-first policy, a longest-first policy, a shortest-first policy, an oldest-first policy, a youngest-first policy, a least-recently-first policy, or a least-frequently-first policy.

13. The method of claim 8, wherein at least the portion of the content is based on a current time, an event, a user history of the user, or any combination thereof.

14. The method of claim 8, wherein obtaining the expected user input interval includes calculating an average, a simple moving average, a weighted moving average, a cumulative moving average, or an exponential moving average on a plurality of user input intervals prior to the one or more user inputs.

15. A computer-readable hardware storage device having instructions stored therein that, when executed by one or more processors, cause the one or more processors to:
receive, at a mobile device, one or more user inputs from a user via a user interface;
obtain an expected user input interval and an expected response latency;
determine whether the expected user input interval is greater than a product of the expected response latency multiplied by a factor, and either:
transmit the one or more user inputs to a remote server and display, via the user interface, one or more predicted inputs received from the remote server when the expected user input interval is greater than the product of the expected response latency multiplied by the factor; or alternatively
rather than transmitting the one or more user inputs to the remote server and receiving the one or more predicted inputs from the remote server, display, via the user interface, one or more predicted inputs received from the local cache when the expected user input interval is less than the product of the expected response latency multiplied by the factor.

16. The computer-readable hardware storage device of claim 15, wherein the instructions for displaying includes instructions that, when executed by the one or more processors, cause the one or more processors to:
display the one or more predicted inputs associated with the content of the local cache in response to the expected user input interval being less than or equal to the product of the expected response latency and the factor; and
display the one or more predicted inputs received from the remote server in response to the expected user input interval being greater than the product of the expected response latency and the factor.

17. The computer-readable hardware storage device of claim 15, further comprising instructions that, when executed by the one or more processors, cause the one or more processors to prepopulate the local cache by downloading at least the portion of the content from the remote server prior to receiving the one or more user inputs.

18. The computer-readable hardware storage device of claim 15, further comprising instructions that, when executed by the one or more processors, cause the one or more processors to update the local cache with the one or more predicted inputs from the remote server.

19. The computer-readable hardware storage device of claim 18, wherein the instructions for updating the local cache includes instructions that, when executed by the one or more processors, cause the one or more processors to prune existing content in the local cache based on a most-specific-first policy, a longest-first policy, a shortest-first policy, an oldest-first policy, a youngest-first policy, a least-recently-first policy, or a least-frequently-first policy.

20. The computer-readable hardware storage device of claim 15, wherein at least the portion of the content is based on a current time, an event, a user history of the user, or any combination thereof.

\* \* \* \* \*